United States Patent
Li et al.

(10) Patent No.: US 11,558,858 B2
(45) Date of Patent: Jan. 17, 2023

(54) INDICATION FOR A TRANSMISSION SCHEME

(71) Applicant: Lenovo (Beijing) Limited, Beijing (CN)

(72) Inventors: Hongchao Li, Beijing (CN); Hongmei Liu, Beijing (CN); Lianhai Wu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 213 days.

(21) Appl. No.: 16/754,716

(22) PCT Filed: Oct. 9, 2017

(86) PCT No.: PCT/CN2017/105305
§ 371 (c)(1),
(2) Date: Apr. 8, 2020

(87) PCT Pub. No.: WO2019/071368
PCT Pub. Date: Apr. 18, 2019

(65) Prior Publication Data
US 2020/0305145 A1    Sep. 24, 2020

(51) Int. Cl.
*H04W 72/04*    (2009.01)
*H04L 5/00*    (2006.01)

(52) U.S. Cl.
CPC ....... *H04W 72/0413* (2013.01); *H04L 5/0053* (2013.01)

(58) Field of Classification Search
CPC ................ H04W 72/0413; H04L 5/0053
See application file for complete search history.

(56) References Cited

U.S. PATENT DOCUMENTS

| | | | |
|---|---|---|---|
| 2013/0194931 A1* | 8/2013 | Lee | H04W 72/04 370/329 |
| 2017/0207839 A1 | 7/2017 | Eitan et al. | |
| 2020/0163095 A1* | 5/2020 | Kim | H04W 76/15 |

FOREIGN PATENT DOCUMENTS

| | | |
|---|---|---|
| CN | 1860702 A | 11/2006 |
| CN | 101098176 A | 1/2008 |

OTHER PUBLICATIONS

Motorola Mobility, Lenovo, "Discussion on PUSCH, PUCCH, and UCI multiplexing", 3GPP TSG RAN WG1 #90bis R1-1718701, Oct. 9-13, 2017, pp. 1-3.
Panasonic, "Discussion on UCI multiplexing", 3GPP TSG RAN WG1 Meeting #90bis R1-1718259, Oct. 9-13, 2017, pp. 1-5.
Samsung, "On UCI Multiplexing in PUSCH", 3GPP TSG RAN WG1 Ad-Hoc Meeting R1-1700948, Jan. 16-20, 2017, pp. 1-4.

(Continued)

*Primary Examiner* — Duc C Ho
(74) *Attorney, Agent, or Firm* — Kunzler Bean & Adamson

(57) ABSTRACT

Apparatuses, methods, and systems are disclosed for transmitting and/or receiving an indication for a transmission scheme. One method includes determining a transmission scheme for transmitting a first channel. The method includes transmitting an indication of the transmission scheme to a base unit. The indication is based on the transmission scheme.

16 Claims, 7 Drawing Sheets

(56) References Cited

OTHER PUBLICATIONS

International Application No. PCT/CN2017/105305, "Notification of Transmittal of the International Search Report and the Written Opinion of the International Searching Authority, or the Declaration" dated Jun. 29, 2018, pp. 1-9.

NTT Docomo, Inc, "Sub-band indication for non-codebook based transmission for uplink", 3GPP TSG RAN WG1 NR Ad-Hoc Meeting R1-1716079, Sep. 18-21, 2017, pp. 1-3.

AT&T, "UL Diversity based Transmission Scheme for NR", 3GPP TSG RAN WG1 #90 R1-1712706, Aug. 21-25, 2017, pp. 1-10.

\* cited by examiner

INDICATION FOR A TRANSMISSION SCHEME

FIELD

The subject matter disclosed herein relates generally to wireless communications and more particularly relates to an indication for a transmission scheme.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Resource Element ("RE"), Radio Resource Control ("RRC"), Random Access Procedure ("RACH"), Random Access Response ("RAR"), Radio Link Failure ("RLF"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, UCI may be multiplexed with a PUSCH. In such networks, a variety of multiplexing options may be used.

BRIEF SUMMARY

Methods for transmitting an indication for a transmission scheme are disclosed. Apparatuses and systems also perform the functions of the method. In one embodiment, the method includes determining a transmission scheme for transmitting a first channel. In certain embodiments, the method includes transmitting an indication of the transmission scheme to a base unit, wherein the indication is based on the transmission scheme.

In one embodiment, transmitting the indication includes encoding the indication and carrying the encoded indication in the first channel. In a further embodiment, transmitting the indication includes masking a cyclic redundancy check of the first channel using the indication. In certain embodiments, the indication is an implicit indication in response to the transmission scheme indicating that the first channel is not transmitted. In various embodiments, transmitting the indication of the transmission scheme to the base unit based on the transmission scheme includes transmitting the first channel based on the transmission scheme. In some embodiments, the transmission scheme is selected from a group including: transmitting a second channel and performing rate matching of the second channel around the first channel; transmitting a second channel and puncturing the second channel by the first channel; transmitting the first channel without transmitting a second channel; transmitting a second channel and puncturing the second channel by resource elements carrying the indication without transmitting the first channel; and transmitting a second channel without the indication and without the first channel.

An apparatus for transmitting an indication for a transmission scheme, in one embodiment, includes a processor that determines a transmission scheme for transmitting a first channel. In various embodiments, the apparatus includes a transmitter that transmits an indication of the transmission scheme to a base unit, wherein the indication is based on the transmission scheme.

In one embodiment, a method for determining a transmission scheme includes determining a duration between an uplink transmission and a downlink transmission. The method, in some embodiments, includes comparing the duration to a threshold duration. In various embodiments, the method includes determining a transmission scheme for transmitting a channel based on the comparison between the duration and the threshold duration.

In one embodiment, in response to the duration being greater than the threshold duration, the transmission scheme for transmitting the channel includes transmitting the channel using rate matching. In a further embodiment, in response to the duration being less than the threshold duration, the transmission scheme for transmitting the channel includes transmitting the channel using puncturing. In certain embodiments, the threshold duration is configured by a base unit. In various embodiments, the threshold duration is predetermined.

In some embodiments, the uplink transmission is an uplink scheduling transmission and the downlink transmission is a downlink scheduling transmission. In one embodiment, the uplink transmission is an uplink scheduling transmission and the downlink transmission includes a trigger. In a further embodiment, the uplink transmission corresponds to the downlink transmission.

An apparatus for determining a transmission scheme, in one embodiment, includes a processor that: determines a duration between an uplink transmission and a downlink transmission; compares the duration to a threshold duration; and determines a transmission scheme for transmitting a channel based on the comparison between the duration and the threshold duration.

One method for receiving an indication for a transmission scheme includes receiving an indication of a transmission scheme from a remote unit, wherein the indication is based on the transmission scheme, and the transmission scheme is for the remote unit transmitting a first channel.

In one embodiment, the indication is encoded and carried in the first channel. In a further embodiment, the indication is used to mask a cyclic redundancy check of the first channel. In certain embodiments, the indication is an implicit indication in response to the transmission scheme indicating that the first channel is not transmitted from the remote unit. In various embodiments, receiving the indication of the transmission scheme from the remote unit includes receiving the first channel based on the transmission scheme. In some embodiments, the transmission scheme is selected from a group including: the remote unit transmitting a second channel and performing rate matching of the second channel around the first channel; the remote unit transmitting a second channel and puncturing the second channel by the first channel; the remote unit transmitting the first channel without transmitting a second channel; the remote unit transmitting a second channel and puncturing the second channel by resource elements carrying the indication without the remote unit transmitting the first channel; and the remote unit transmitting a second channel without the indication and without the first channel.

An apparatus for receiving an indication for a transmission scheme, in one embodiment, includes a receiver that receives an indication of a transmission scheme from a remote unit, wherein the indication is based on the transmission scheme, and the transmission scheme is for the remote unit transmitting a first channel.

In one embodiment, a method for determining a transmission scheme includes determining a duration between an uplink transmission and a downlink transmission. The method, in some embodiments, includes comparing the duration to a threshold duration. In various embodiments, the method includes determining a transmission scheme for a remote unit transmitting a channel based on the comparison between the duration and the threshold duration.

In one embodiment, in response to the duration being greater than the threshold duration, the transmission scheme for the remote unit transmitting the channel includes the remote unit transmitting the channel using rate matching. In a further embodiment, in response to the duration being less than the threshold duration, the transmission scheme for the remote unit transmitting the channel includes the remote unit transmitting the channel using puncturing. In certain embodiments, the threshold duration is configured by a base unit. In various embodiments, the threshold duration is predetermined.

In some embodiments, the uplink transmission is an uplink scheduling transmission and the downlink transmission is a downlink scheduling transmission. In one embodiment, the uplink transmission is an uplink scheduling transmission and the downlink transmission includes a trigger. In a further embodiment, the uplink transmission corresponds to the downlink transmission.

An apparatus for determining a transmission scheme, in one embodiment, includes a processor that: determines a duration between an uplink transmission and a downlink transmission; compares the duration to a threshold duration; and determines a transmission scheme for a remote unit transmitting a channel based on the comparison between the duration and the threshold duration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
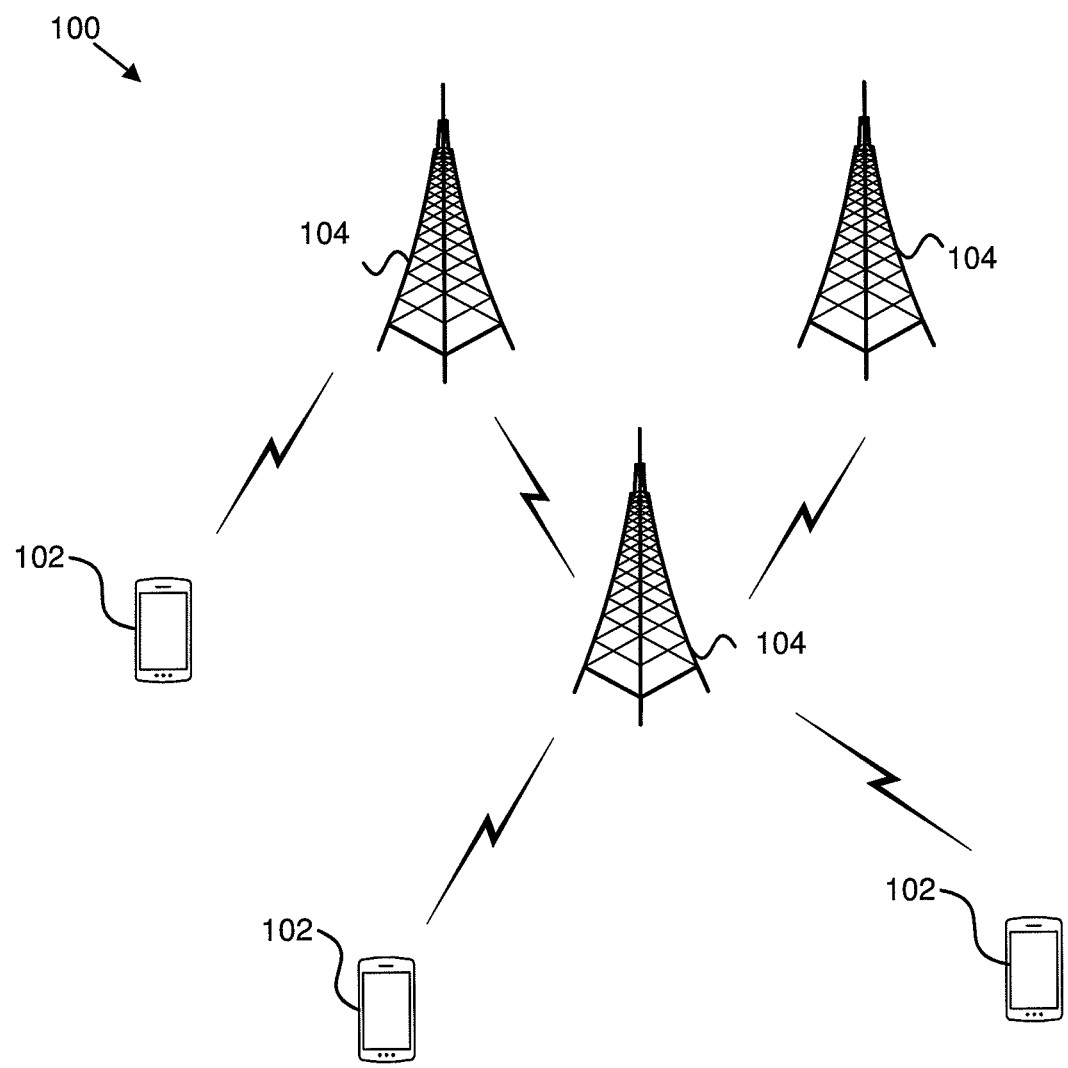
FIG. 1 is a schematic block diagram illustrating one embodiment of a wireless communication system for transmitting and/or receiving an indication for a transmission scheme.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving an indication for a transmission scheme. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine a transmission scheme for transmitting a first channel. In certain embodiments, the remote unit 102 may transmit an indication of the transmission scheme to a base unit 104. In such embodiments, the indication may be based on the transmission scheme. Accordingly, a remote unit 102 may be used for transmitting an indication for a transmission scheme.

In another embodiment, a remote unit 102 may determine a duration between an uplink transmission and a downlink transmission. In some embodiments, the remote unit 102 may compare the duration to a threshold duration. In various embodiments, the remote unit 102 may determine a transmission scheme for transmitting a channel based on the comparison between the duration and the threshold duration. Accordingly, a remote unit 102 may be used for determining a transmission scheme.

In one embodiment, a base unit 104 may receive an indication of a transmission scheme from a remote unit 102. In such an embodiment, the indication may be based on the transmission scheme, and the transmission scheme may be for the remote unit 102 transmitting a first channel. Accordingly, a base unit 104 may be used for receiving an indication for a transmission scheme.

In another embodiment, a base unit 104 may determine a duration between an uplink transmission and a downlink transmission. In some embodiments, the base unit 104 may compare the duration to a threshold duration. In various embodiments, the base unit 104 may determine a transmission scheme for a remote unit 102 transmitting a channel based on the comparison between the duration and the threshold duration. Accordingly, a base unit 104 may be used for determining a transmission scheme.

Figure 2:
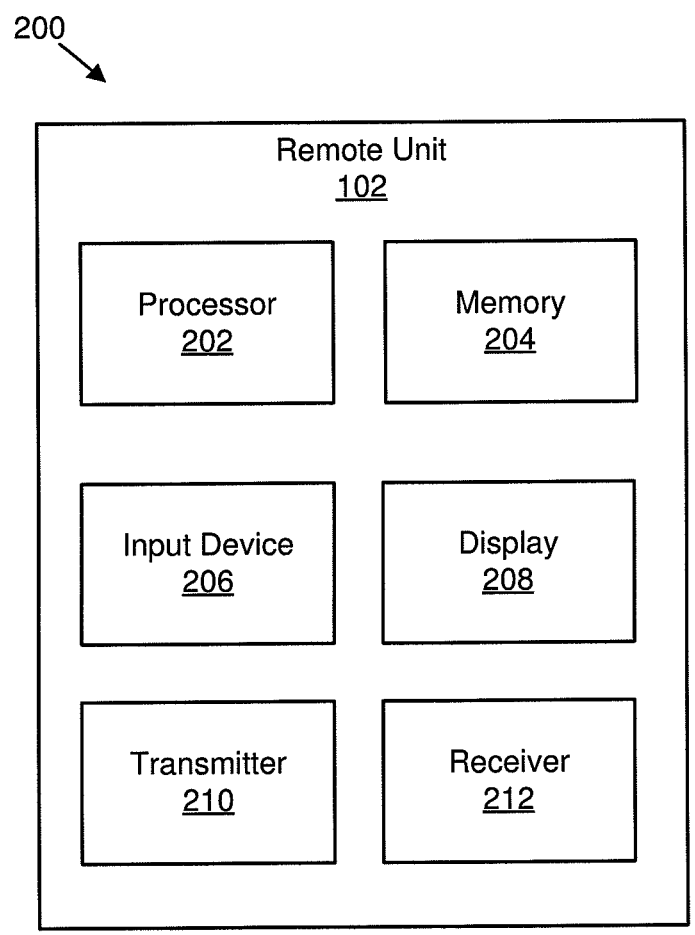
FIG. 2 is a schematic block diagram illustrating one embodiment of an apparatus that may be used for transmitting an indication for a transmission scheme.

FIG. 2 depicts one embodiment of an apparatus 200 that may be used for transmitting an indication for a transmission scheme. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine a transmission scheme for transmitting a first channel. In some embodiments, the processor 202 may determine a duration between an uplink transmission and a downlink transmission. In various embodiments, the processor 202 may compare the duration to a threshold duration. In certain embodiments, the processor 202 may determine a transmission scheme for transmitting a channel based on the comparison between the duration and the threshold duration. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 may be used to transmit an indication of a transmission scheme to a base unit 104. In such an embodiment, the indication may be based on the transmission scheme. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

In some embodiments, in terms of the remote unit 102 implementation, puncturing may be preferred over rate matching from the processor's 202 perspective because the processor 202 may start to prepare UL data without considering whether and how many UCI bits need to be multiplexed with PUSCH. In certain embodiments, in an RE mapping stage, the remote unit 102 only needs to puncture the REs for UCI bits. However, the performance (e.g., reliability) may be degraded compared with rate-matching.

In embodiments that use rate matching, the performance (e.g., reliability) may be better than embodiments that use puncturing; however, rate matching uses higher remote unit 102 processing capability. In some embodiments, a number of UCI bits and a number of REs may be indicated to the remote unit 102 as early to facilitate channel encoding procedures. In various embodiments, HARQ-ACK feedback and UL scheduling timelines may be flexible. In such embodiments, if a DL scheduling command arrives late compared with an UL grant (e.g., K0=0 to achieve self-contain operation, in other words, DL scheduling and HARQ-ACK feedback occur in one slot), depending on remote unit 102 processing capability, UL TB preparation may be impacted with the consequence that an UL grant timeline may not be able to be achieved. Accordingly, remote unit 102 behavior may be impacted in certain conditions even if a base unit 104 is able to provide definite instructions to the remote unit 102 regarding using rate-matching.

In certain embodiments, two options may be used to handle remote unit 102 behavior: 1) use an indication from the remote unit 102 to tell the base unit 104 a remote unit 102 behavior on how to handle UCI multiplexing with PUSCH (this can avoid unnecessary ambiguity between the remote unit 102 and the base unit 104); and/or 2) remote unit 102 behavior for puncturing and/or rate matching may depend on a time interval (e.g., a time interval between a PUSCH transmission instance when multiplexing occurs and a PDSCH transmission, such as a PDSCH transmission corresponding to a HARQ-ACK in UCI). In such embodiments, if the time interval is larger than a threshold, rate matching may be used by the remote unit 102 and assumed by the base unit 104. Otherwise, puncturing may be used by the remote unit 102 and assumed by the base unit 104. The threshold may be configured by the base unit 104 and/or may be predefined (e.g., fixed in a specification).

In some embodiments, UCI is multiplexed with a PUSCH transmission in situations in which no PUCCH is configured in a certain slot for a certain remote unit 102. In certain embodiments, HARQ-ACK is punctured due to a possible PDCCH misdirection ambiguity. In certain embodiments, UL TB encoding and RE mapping procedures may not take into account whether there is a valid DL scheduling and whether there needs to be feedback (e.g., HARQ-ACK). In such embodiments, CSI may be rate matched.

In various embodiments, one or more of the following may be used: 1) for UCI multiplexed with PUSCH, puncturing may be used; 2) for UCI multiplexed with PUSCH, rate-matching may be used; 3) for UCI multiplexed with PUSCH, puncturing may be used if HARQ-ACK bits are up to 2 bits, otherwise rate matching may be used; 4) it is indicated in an UL grant whether puncturing or rate matching is used for UCI multiplexing with PUSCH; and 5) it is up to a remote unit 102 implementation to determine whether puncturing or rate matching is used. In the remote unit 102 implementation, the base unit 104 may need to do blind detection to identify whether puncturing or rate matching is used.

In some embodiments, even though rate matching may be preferred over puncturing (rate matching may be indicated by the base unit 104 or predetermined, such as by being fixed in a specification), a remote unit 102 implementation of determining whether rate matching or puncturing is used may be beneficial because other implementations may fail to prepare an UL transmission rate matching around UCI REs within a required processing timeline. Such a remote unit 102 implementation may consider many factors such as that MIMO CSI measurement may occupy some processing resources, and also that DL and UL transmission modes and TB size may impact whether a remote unit 102 may successfully use rate matching. In contrast, a base unit 104 may not be able to foresee the remote unit 102 behavior. Therefore, a remote unit 102 may indicate to a base unit 104 how transmission of a first channel (e.g., UCI) is handled. In some embodiments, the remote unit 102 may handle transmission of a channel using one or more of the following transmission schemes: a second channel (e.g., PUSCH) is transmitted and rate matched around a first channel (e.g., REs carrying UCI bits); the second channel is transmitted and punctured by the first channel; only the first channel is transmitted (e.g., in PUSCH) and the second channel is not transmitted; the second channel is transmitted and punctured by some REs which include a remote unit 102 behavior indication rather than carrying the first channel; and only the second channel is transmitted.

In certain embodiments, an indicator may be explicitly used in the first channel to indicate puncturing, rate matching status, and/or dropping of the second channel. For example, an indicator may be encoded and carried in the first channel. As another example, an indicator may be used as mask in a CRC of first channel encoding. In some embodiments, lack of an explicit indicator may indicate that only the second channel is transmitted.

By using an indicator provided from the remote unit 102 to the base unit 104, the behavior of the remote unit 102 may be clearly indicated to the base unit 104. Accordingly, by having the indicator from the remote unit 102, the base unit 104 may eliminate possible ambiguity that occurs by the base unit 104 using blind detection thereby reducing performance loss and/or an increased burden on the base unit 104. In some embodiments, the base unit 104 may decode a first channel payload first, and then use an indication carried in the first channel to determine second channel decoding.

In certain embodiments, an indicator may be implicit. For example, behavior of the remote unit 102 may be determined based on a comparison between a duration (e.g., time interval) and a duration threshold (e.g., time interval threshold). In some embodiments, the duration may be between an uplink transmission (e.g., PUSCH, UCI) such as when multiplexing happens and a downlink transmission (e.g., PDSCH corresponding to HARQ-ACK in UCI). In various embodiments, the duration may be from an uplink transmission (e.g., PUSCH, UCI) such as when multiplexing happens to a downlink transmission (e.g., PDCCH) working as a trigger (e.g., an aperiodic CSI trigger) and may correspond to the CSI feedback in the UCI. In certain embodiments, the duration may be a duration between an uplink scheduling transmission and a downlink scheduling transmission. In some embodiments, the duration may be a duration between an uplink scheduling transmission and an aperiodic CSI triggering in a PDCCH transmission. In various embodiments, if the duration is larger than the threshold duration, which means that the remote unit 102 may have sufficient time to do rate matching, rate matching is used by the remote unit 102 and assumed by the base unit 104. In some embodiments, if the duration is not larger than the threshold duration, which means the DL scheduling comes too late for the remote unit 102 to make preparations for rate matching, puncturing is used by the remote unit 102 and assumed by the base unit 104. In certain embodiments, the threshold duration may be configured by the base unit. In various embodiments, the threshold duration may be predetermined (e.g., fixed in a specification, hard coded, etc.).

Figure 3:
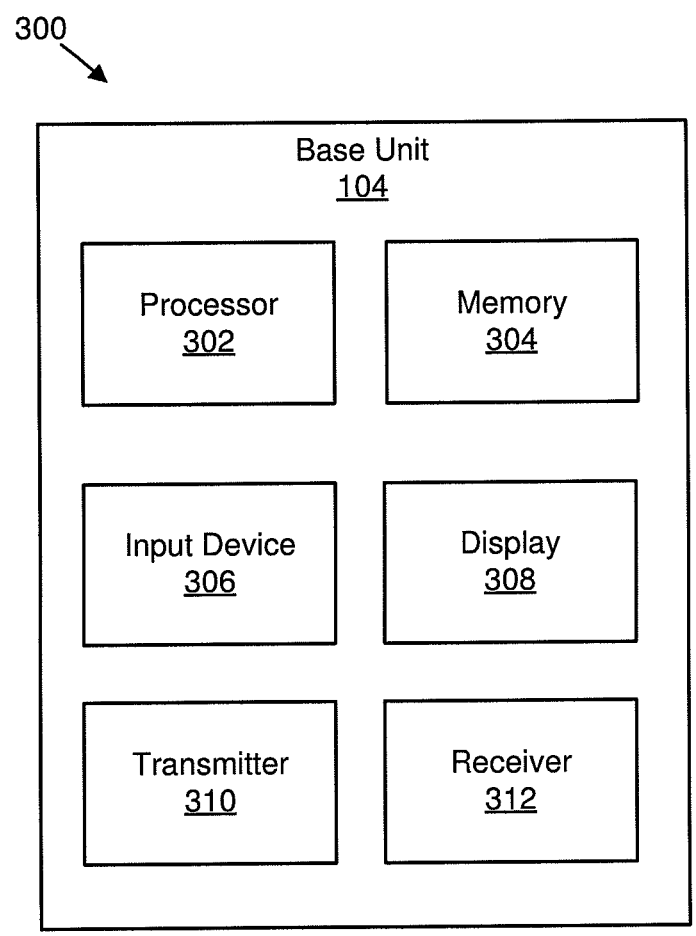
FIG. 3 is a schematic block diagram illustrating one embodiment of an apparatus that may be used for receiving an indication for a transmission scheme.

FIG. 3 depicts one embodiment of an apparatus 300 that may be used for receiving an indication for a transmission scheme. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive an indication of a transmission scheme from a remote unit 102. In such embodiments, the indication may be based on the transmission scheme, and the transmission scheme may be for the remote unit 102 transmitting a first channel. In certain embodiments, the processor 302 may: determine a duration between an uplink transmission and a downlink transmission; compare the duration to a threshold duration; and/or determine a transmission scheme for a remote unit 102 transmitting a channel based on the comparison between the duration and the threshold duration. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
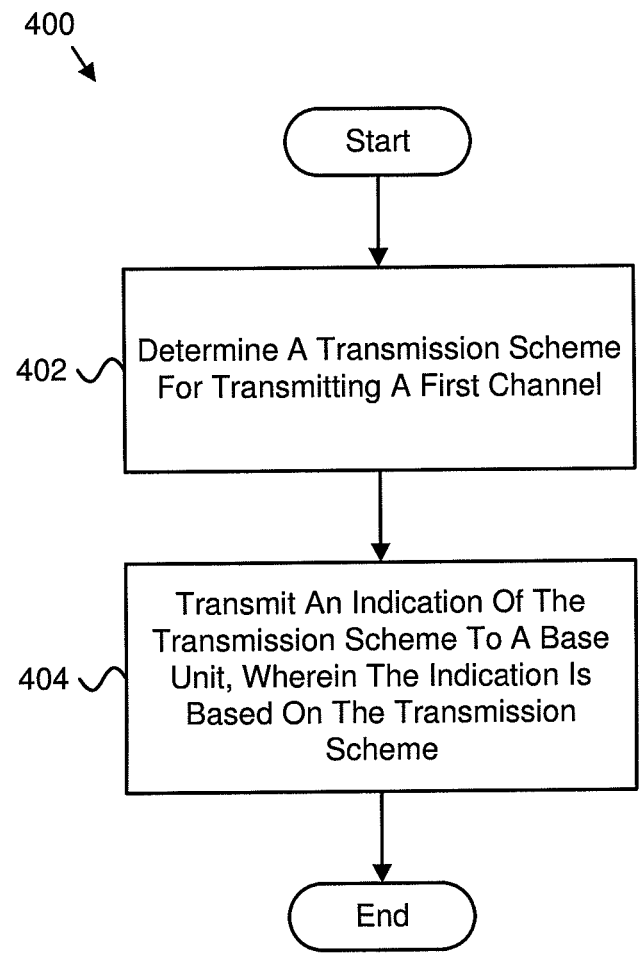
FIG. 4 is a schematic flow chart diagram illustrating one embodiment of a method for transmitting an indication for a transmission scheme.

FIG. 4 is a schematic flow chart diagram illustrating one embodiment of a method 400 for transmitting an indication for a transmission scheme. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include determining 402 a transmission scheme for transmitting a first channel. In certain embodiments, the method 400 includes transmitting 404 an indication of the transmission scheme to a base unit 104. In such embodiments, the indication may be based on the transmission scheme.

In one embodiment, transmitting the indication includes encoding the indication and carrying the encoded indication in the first channel. In a further embodiment, transmitting the indication includes masking a cyclic redundancy check of the first channel using the indication. In certain embodiments, the indication is an implicit indication in response to the transmission scheme indicating that the first channel is not transmitted. In various embodiments, transmitting the indication of the transmission scheme to the base unit based on the transmission scheme includes transmitting the first channel based on the transmission scheme. In some embodiments, the transmission scheme is selected from a group including: transmitting a second channel and performing rate matching of the second channel around the first channel; transmitting a second channel and puncturing the second channel by the first channel; transmitting the first channel without transmitting a second channel; transmitting a second channel and puncturing the second channel by resource elements carrying the indication without transmitting the first channel; and/or transmitting a second channel without the indication and without the first channel.

Figure 5:
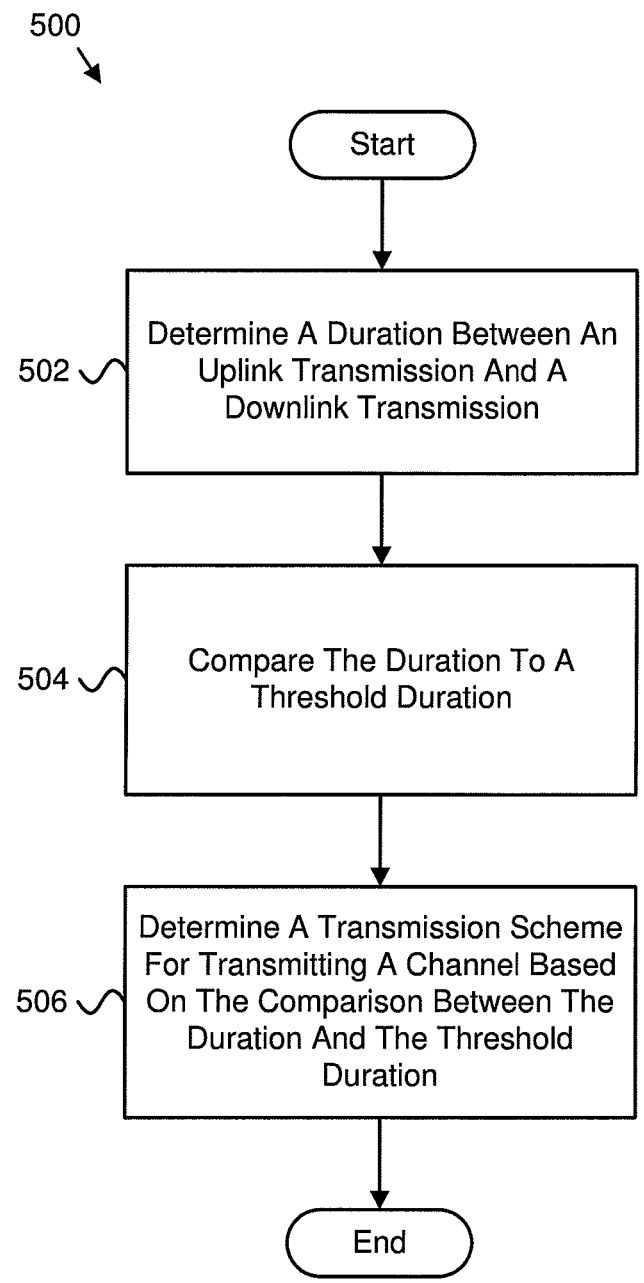
FIG. 5 is a schematic flow chart diagram illustrating one embodiment of a method for determining a transmission scheme.

FIG. 5 is a schematic flow chart diagram illustrating one embodiment of a method 500 for determining a transmission scheme. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include determining 502 a duration between an uplink transmission and a downlink transmission. The method 500, in some embodiments, includes comparing 504 the duration to a threshold duration. In various embodiments, the method 500 includes determining 506 a transmission scheme for transmitting a channel based on the comparison between the duration and the threshold duration.

In one embodiment, in response to the duration being greater than the threshold duration, the transmission scheme for transmitting the channel includes transmitting the channel using rate matching. In a further embodiment, in response to the duration being less than the threshold duration, the transmission scheme for transmitting the channel includes transmitting the channel using puncturing. In certain embodiments, the threshold duration is configured by a base unit. In various embodiments, the threshold duration is predetermined.

In some embodiments, the uplink transmission is an uplink scheduling transmission and the downlink transmission is a downlink scheduling transmission. In one embodiment, the uplink transmission is an uplink scheduling transmission and the downlink transmission includes a trigger. In a further embodiment, the uplink transmission corresponds to the downlink transmission.

Figure 6:
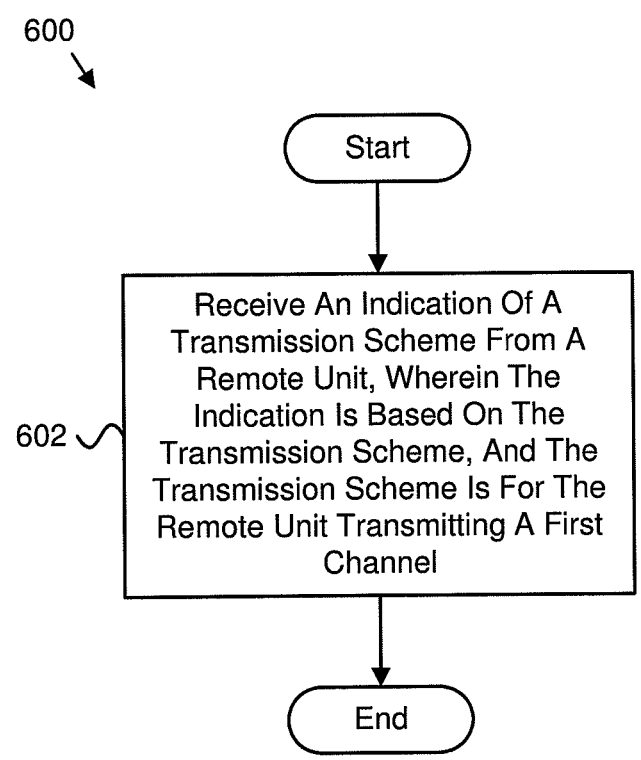
FIG. 6 is a schematic flow chart diagram illustrating one embodiment of a method for receiving an indication for a transmission scheme.

FIG. 6 is a schematic flow chart diagram illustrating one embodiment of a method 600 for receiving an indication for a transmission scheme. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602 an indication of a transmission scheme from a remote unit 102. In such an embodiment, the indication may be based on the transmission scheme, and the transmission scheme may be for the remote unit transmitting a first channel.

In one embodiment, the indication is encoded and carried in the first channel. In a further embodiment, the indication is used to mask a cyclic redundancy check of the first channel. In certain embodiments, the indication is an implicit indication in response to the transmission scheme indicating that the first channel is not transmitted from the remote unit. In various embodiments, receiving the indication of the transmission scheme from the remote unit includes receiving the first channel based on the transmission scheme. In some embodiments, the transmission scheme is selected from a group including: the remote unit transmitting a second channel and performing rate matching of the second channel around the first channel; the remote unit transmitting a second channel and puncturing the second channel by the first channel; the remote unit transmitting the first channel without transmitting a second channel; the remote unit transmitting a second channel and puncturing the second channel by resource elements carrying the indication without the remote unit transmitting the first channel; and/or the remote unit transmitting a second channel without the indication and without the first channel.

Figure 7:
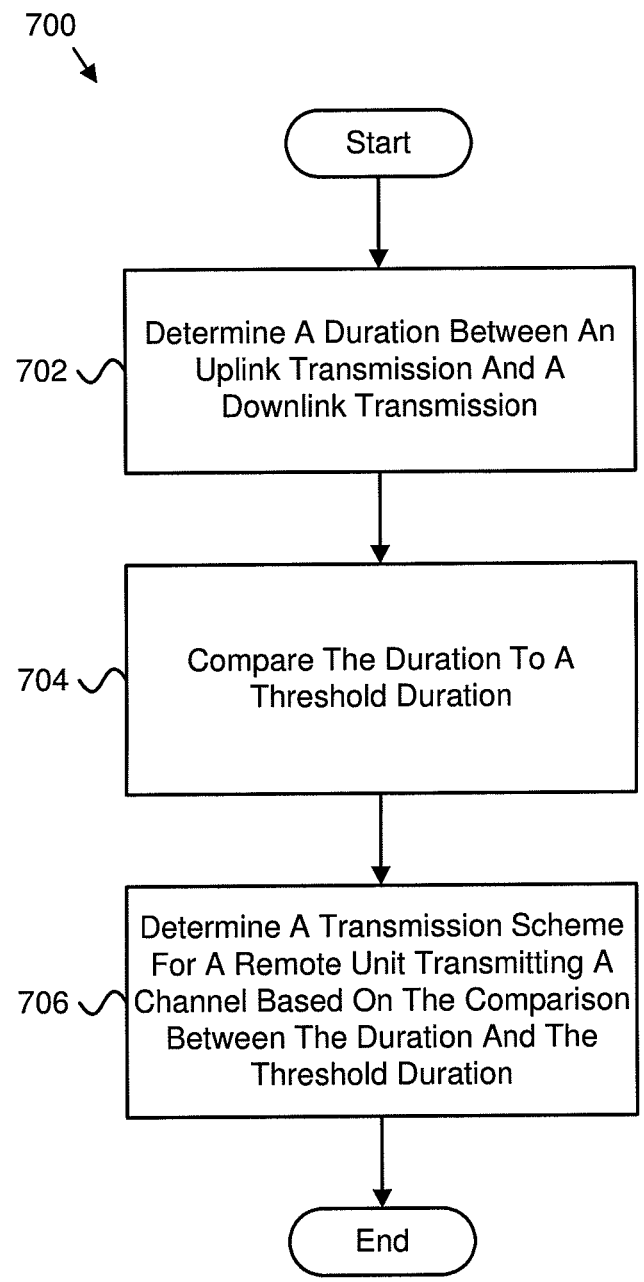
FIG. 7 is a schematic flow chart diagram illustrating another embodiment of a method for determining a transmission scheme.

FIG. 7 is a schematic flow chart diagram illustrating another embodiment of a method 700 for determining a transmission scheme. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include determining 702 a duration between an uplink transmission and a downlink transmission. The method 700, in some embodiments, includes comparing 704 the duration to a threshold duration. In various embodiments, the method 700 includes determining 706 a transmission scheme for a remote unit 102 transmitting a channel based on the comparison between the duration and the threshold duration.

In one embodiment, in response to the duration being greater than the threshold duration, the transmission scheme for the remote unit 102 transmitting the channel includes the remote unit 102 transmitting the channel using rate matching. In a further embodiment, in response to the duration being less than the threshold duration, the transmission scheme for the remote unit 102 transmitting the channel includes the remote unit 102 transmitting the channel using puncturing. In certain embodiments, the threshold duration is configured by a base unit 104. In various embodiments, the threshold duration is predetermined.

In some embodiments, the uplink transmission is an uplink scheduling transmission and the downlink transmission is a downlink scheduling transmission. In one embodiment, the uplink transmission is an uplink scheduling transmission and the downlink transmission includes a trigger. In a further embodiment, the uplink transmission corresponds to the downlink transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
    determining a duration between an uplink transmission and a downlink transmission;
    comparing the duration to a threshold duration; and
    determining a transmission scheme for transmitting a channel based on the comparison between the duration and the threshold duration.

2. The method of claim 1, wherein, in response to the duration being greater than the threshold duration, the transmission scheme for transmitting the channel comprises transmitting the channel using rate matching.

3. The method of claim 1, wherein, in response to the duration being less than the threshold duration, the transmission scheme for transmitting the channel comprises transmitting the channel using puncturing.

4. The method of claim 1, wherein the threshold duration is configured by a base unit.

5. The method of claim 1, wherein the threshold duration is predetermined.

6. The method of claim 1, wherein the uplink transmission is an uplink scheduling transmission and the downlink transmission is a downlink scheduling transmission.

7. The method of claim 1, wherein the uplink transmission is an uplink scheduling transmission and the downlink transmission comprises a trigger.

8. The method of claim 1, wherein the uplink transmission corresponds to the downlink transmission.

9. An apparatus comprising:
    a processor that:
        determines a duration between an uplink transmission and a downlink transmission;
        compares the duration to a threshold duration; and
        determines a transmission scheme for transmitting a channel based on the comparison between the duration and the threshold duration.

10. The apparatus of claim 9, wherein, in response to the duration being greater than the threshold duration, the transmission scheme for transmitting the channel comprises transmitting the channel using rate matching.

11. The apparatus of claim 9, wherein, in response to the duration being less than the threshold duration, the transmission scheme for transmitting the channel comprises transmitting the channel using puncturing.

12. The apparatus of claim 9, wherein the threshold duration is configured by a base unit.

13. The apparatus of claim 9, wherein the threshold duration is predetermined.

14. The apparatus of claim 9, wherein the uplink transmission is an uplink scheduling transmission and the downlink transmission is a downlink scheduling transmission.

15. The apparatus of claim 9, wherein the uplink transmission is an uplink scheduling transmission and the downlink transmission comprises a trigger.

16. The apparatus of claim 9, wherein the uplink transmission corresponds to the downlink transmission.

\* \* \* \* \*